Oct. 30, 1962  R. L. RATHER ET AL  3,060,886
UNDERWATER TOW CABLE
Filed July 5, 1961  2 Sheets-Sheet 1
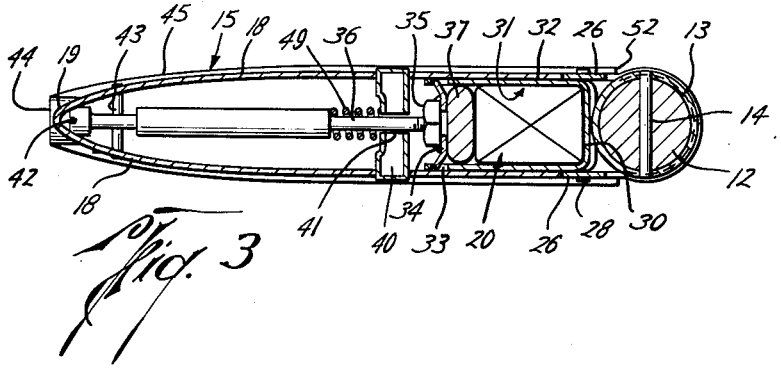
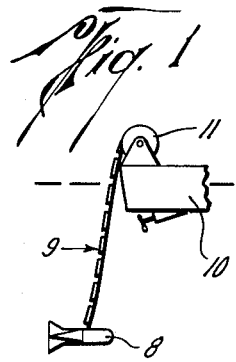
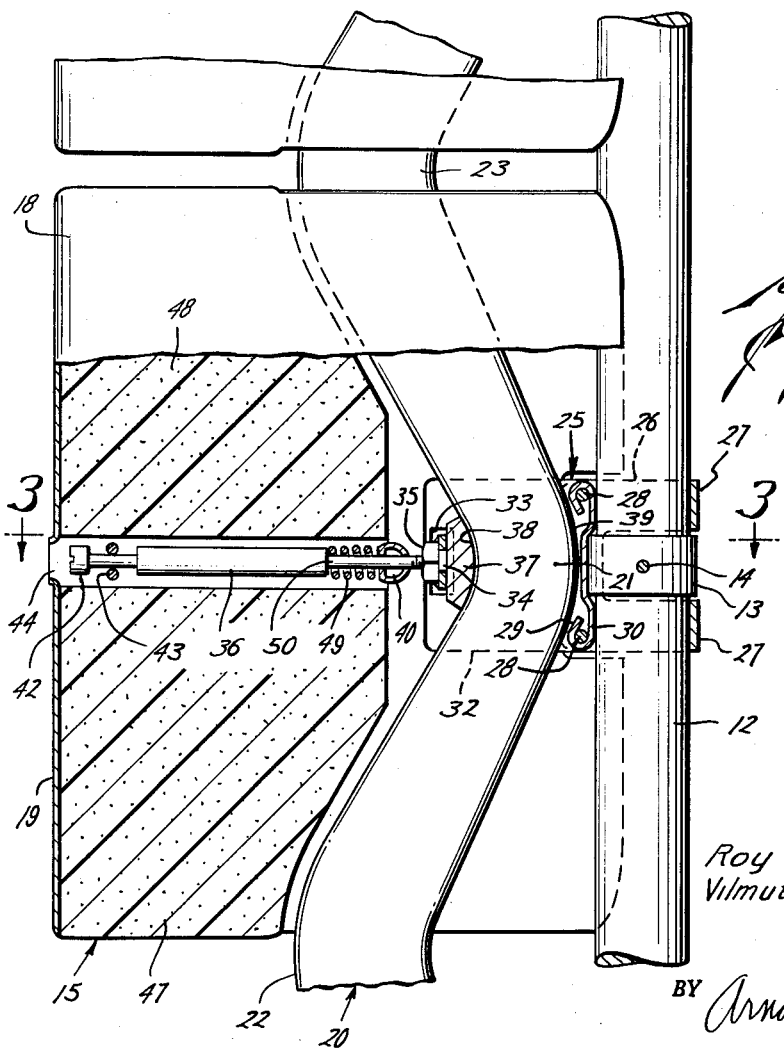
Roy L. Rather
Vilmuth P. Goerland
INVENTORS
BY *Arnold and Saylance*
ATTORNEY

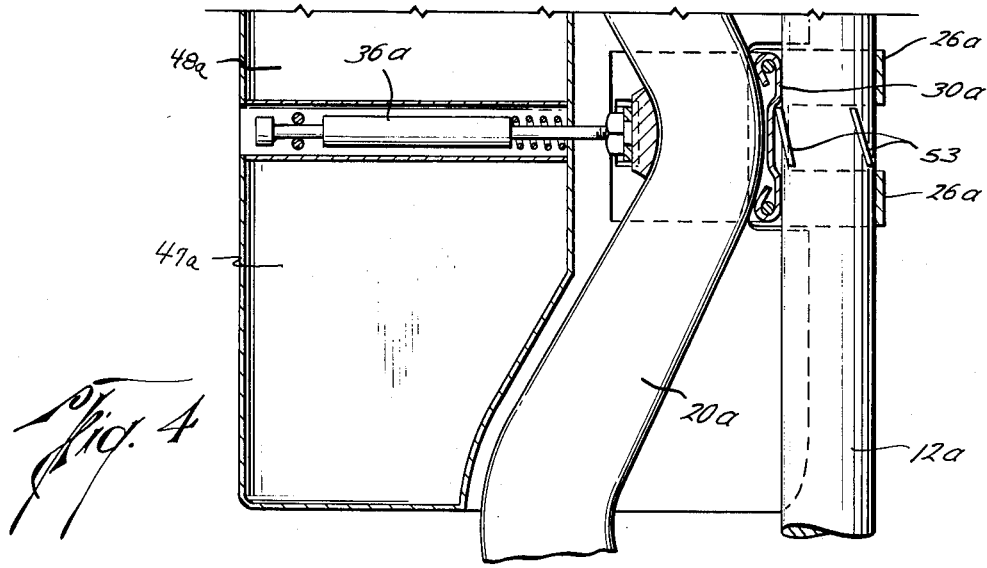
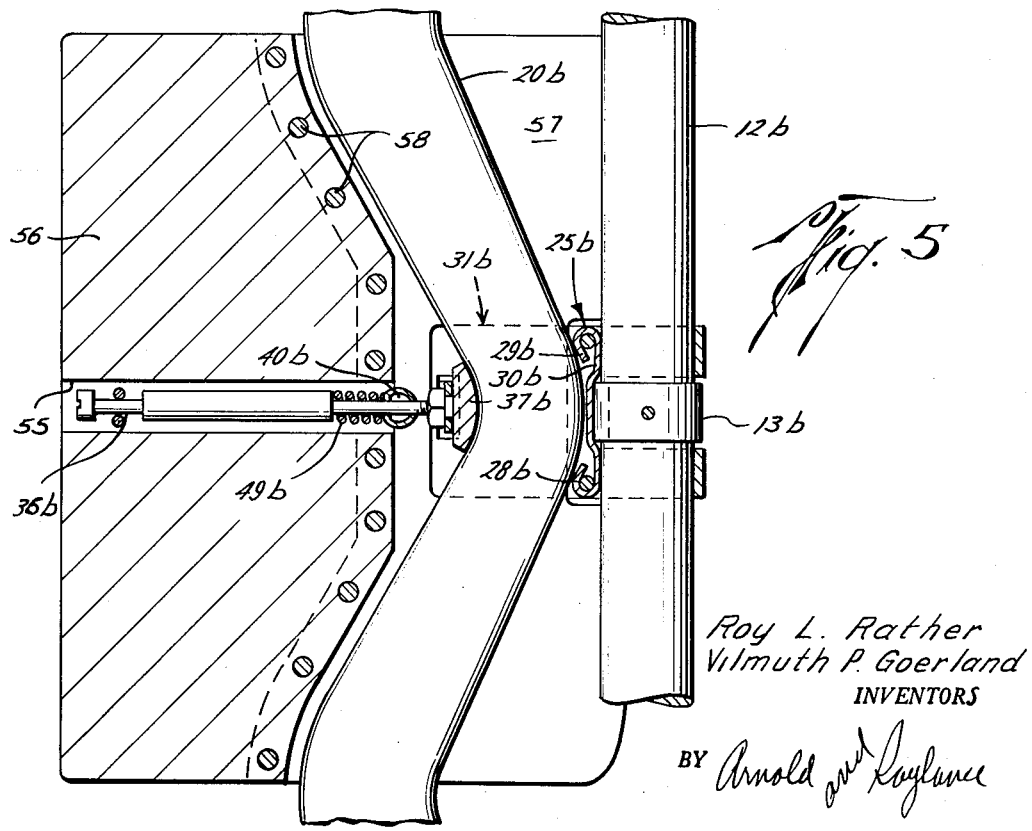

3,060,886
UNDERWATER TOW CABLE
Roy L. Rather and Vilmuth P. Goerland, Houston, Tex., assignors to Commercial Engineering Corporation, Harris County, Tex., a corporation of Texas
Filed July 5, 1961, Ser. No. 122,013
11 Claims. (Cl. 114—235)

This invention relates to cable devices of the type used in towing submerged objects, such as carriers for sensitive instruments and the like.

In previous tow devices of this type, there has been substantial difficulty in equipping the device with fairing means for reducing drag which, while being sufficiently flexible to permit reeling of the device upon a storage drum, will be sufficiently stable during towing to prevent flopping of the structures. Furthermore, difficulties have been presented in providing the device with a flexible signal conductor, such as an electrical cable, which will not be adversely affected and far too quickly worn out by flexing and vibration of the stress carrying portion of the cable device both during towing and reeling.

Accordingly, an object of the present invention is to provide a tow cable device of the above type having fairing structures mounted thereon in such a way as to facilitate reeling of the stress carrying part of the device with minimum interference from the fairing structure.

Another object is to provide a cable device of the above type with fairing structures which carry a flexible conductor in such a manner that the conductor will not be unduly stressed or abraded during flexing of the device.

Another object is to provide an under water tow cable device with means for carrying a flexible conductor in longitudinally aligned undulations which are secured to the stress carrying member only at longitudinally restricted points at the crests of certain undulations or convolutions of the conductor so that the intervening convolutions are free to flex, during flexing of the cable device, without unduly stressing or abrading the conductor.

Another object is to provide a tow cable which carries substantially more conductors in the harness than prior cables of this type with minimum frontal area.

These objects and other more detailed objects hereafter appearing are attained substantially in the novel device herein disclosed which in general, consists, preferably, of a standard tension bearing cable, for instance of the twisted strand type, having radial shoulders or rings secured at intervals therealong. A plurality of fairing structures are secured to the cable at said shoulders or rings, each comprising a tapered skin projecting tangentially from opposite sides of the cable and between the side wall portions of which there is provided longitudinally centered means for gripping the cable and also for gripping a crest portion of an undulating flexible conductor extending therethrough. Buoyant material may be lodged within or secured to the structure, but the conductor has adequate freedom to permit, during flexing of the cable, flexing of the undulations or convolutions of the conductor which intervene between the anchored convolutions.

In the accompanying drawings which illustrate the invention, FIG. 1 is a schematic elevation showing the novel towing device utilized in towing the underwater object behind a vessel.

FIG. 2 is an enlarged elevation of one of the faired structures and part of an adjacent one, portions being broken away and sectioned.

FIG. 3 is a transverse section taken substantially on line 3—3 of FIG. 2.

FIG. 4 is a view similar to FIG. 2 but showing modified means for anchoring the faired structures to the cable.

FIG. 5 is a view similar to FIGS. 2 and 4 and showing still another modification.

FIG. 1 shows a body 8, such as an instrument casing, towed by means of the novel tow cable, generally designated 9, behind a vessel 10, which has a reeling drum 11 mounted on the stern thereof. The tow cable device includes a main longitudinal stress bearing member 12 which, preferably, is a standard twisted strand cable, having rings or collars 13 secured at regular intervals therealong, as by pins 14. Faired structures, generally designated 15, are anchored to the cable at the rings 13.

Each faired structure comprises a relatively thin skin of metal or other suitable material having spaced parallel side wall portions 18 which project tangentially from the cable and taper outwardly to a feathered edge 19. Received between the spaced walls 18 and extending longitudinally through all of the faired structures along the cable is a flexible conductor harness 20 which is confined in undulating or serpentine form by the faired structures, as will be described. A single bight or convolution of the harness is received within each faired structure, as shown in FIG. 2, with a crest portion 21 thereof centered, and adjacent convolutions 22 and 23 extend between adjacent faired structures. Any number of harness convolutions may be formed within a faired structure.

Snugly received about cable 12 at each ring 13 is a generally U-shaped clevis bracket 25 having side pieces 26 forming semi-circular, longitudinally-spaced loops 27 which underlie the cable on opposite sides of one of the rings 13. A pair of pins 28 are seated in and extend between side pieces 26 near their outer edges. Snugly received about pins 28 are loops 29 formed at the side edges of the transverse bottom web 30 of a U-shaped clamping bracket 31. Clamping bracket 31 nests within the outer part of clevis bracket 25 and, in effect, forms a continuation thereof. Transverse web 30 rests against cable 12, spanning ring 13 thereon.

Side pieces or legs 32 of bracket 31 extend upwardly along the inner faces of side walls 18 and each has a recess 33 near its upper extremity. A transverse key 34 has upturned extremities lodged in slots 33. A nut 35 is welded to the upper surface of key 34 and a bolt 36 is threaded into the nut and projects outwardly therefrom. A gripping or cushioning member 37, conveniently of rubber or other resilient material is lodged between key 34 and the concave face 38 of the conductor at the center of crest or bight 21 thereof. The opposed convexity 39 of the conductor rests against bottom web 30 of bracket 31, the previously mentioned loops 29 constituting longitudinally spaced abutments forming a pocket therebetwen which snugly accommodates the mentioned convexity.

A bar 40, conveniently hollow, is lodged in side walls 18 and traverses the faired structure at a point spaced slightly outwardly from nut 35. Bar 40 has a central orifice 41 through which bolt 36 extends. The outer extremity of bolt 36 is provided with a kerf 42 or other suitable means for accommodating a tool in screwing the bolt into nut 35 during the assembly. Pins 43 are provided on each side of the bolt. The feathered extremity 19 of side walls 18 is apertured, as at 44, to accommodate such a tool, while the side walls are centrally bulged outwardly, as at 45 to accommodate the bolt. Suitable buoyant material 47 and 48 is lodged within the outer portion of the faired structure, on each side of bolt 36, adequate clearance being provided between such material and the convolutions of the conductor. A coiled spring 49 is interposed between bar 40 and a radial shoulder 50 on bolt 36 to conveniently form a resilient connection between the faired structure proper and the cable clamping means.

In assembling the faired structure upon cable 12 having rings 13 previously secured thereto, clevis bracket 25 and clamping bracket 31 are first assembled about the cable with loops 27 on opposite sides of a ring 13. Loops 29 are bent about cross pins 28 to maintain the assembly and to form a pocket for accommodating convexity 39 in the conductor. The harness is then formed in undulations, as illustrated, and a crest portion 21 thereof is rested in the pocket formed by web 30 and loops 29. Cushion member 37 is then laid against concavity 38 and the key-nut element 34—35 inserted in slots 33, side pieces 32 being slightly spread to permit this. This positioning of slots 33 and the shape of key 34 and cushion 37, with respect to bracket 25, are such as to snugly confine the harness. Next, the skin portion, including side walls 18, with material 47 and 48 lodged therein and bar 40 extending thereacross, is outfitted with bolt 36, having spring 49 received thereon, by insertion of bolt 36 through aperture 44 in the skin and aperture 41 in bar 40. Pins 43 are then inserted. The fairing assembly is then applied over the harness and cable 12 and bolt 36 is threaded into nut 35. In the assembled position, the inner edges of side walls 18 are slightly spaced from cable 12, as indicated at 52. As a result of this spacing between the inner edge of side wall 18 and cable 12 some relative lateral displacement between the main body of the faired structure and cable 12, during flexing thereof, is accommodated. If the cable is flexed beyond the limits of this spacing, cable 12 will abut an inner edge of side wall 18 to vertically displace the main body of the faired structure and compress spring 49 to permit further such relative displacement in which event the faired structure will be kept longitudinally aligned by clevis 25. Thus, when cable 12 is subsequently relaxed, spring 49 will expand thereby returning the faired structure and cable 12 to normal positional relation.

During such flexing, the intervening convolutions or bights 22 and 23, between the confined crest portions 21 may flex longitudinally so as to avoid undue stressing of the conductor. Thus, during flexing of the cable, even during reeling on the storage drum, stresses in the conductor will be reduced to a minimum. Nevertheless, any of the fairing structures may be readily removed by simply unscrewing bolt 36 and withdrawing skin structure and buoyant packing to expose the harness for inspection and replacement if necessary, without the necessity of providing a new faired structure. If desired, opposed plate members or tough wrapping may conveniently cover the sides of harness crest portions 21 thereby further protecting the harness from damage due to rubbing contact with the end edges of sidewalls 18.

In the form in FIG. 4, parts of the faired structure are the same as in FIG. 2 and are designated with the same reference numerals with appended "a." However, in place of rings or collars 13, there are welded or otherwise secured to the strands of the cable 12a, at intervals therealong, outwardly projecting, pin-like pieces 53 which form radial shoulders about which clevis bracket loops 26a are received. Also, it will be noted that closed chambers 47a and 48a have been substituted for material 47 and 48 to provide a faired structure of all-metal construction.

FIG. 5 shows a simplified modification in which the sheet metal skin does not completely surround the faired structure. The inner portions are similar to corresponding parts shown in FIGS. 2 and 3 including clevis bracket member 25b encompassing the cable on opposite sides of the ring 13b secured to cable 12b, and U-shaped clamping bracket 31b, having the transverse web 30b with looped eyes 29b receiving attached pins 28b. A pad 37b rests upon the concave outer surface of a crest of the undulating harness 20b and this crest portion is gripped between the pad and loop elements 29b. Bolt 36b projects outwardly through an orifice 55 drilled in the center of an outwardly tapered body member 56, preferably of wood or other buoyant material. The convex inner edge of the body member is secured by a row of pins or rivets 58 to the side wall members 57 which extend on both sides of harness 20b. Coiled spring 49b is compressed between a shoulder on the bolt and a bar member 40b, seated in a body member 57. This form is assembled and operates the same as the first form described.

An important advantage of the herein disclosed cable and fairing structures is that the torsional resiliency of the undulating conductor is utilized to maintain the fairing structures properly aligned during reeling. Furthermore, ample space is provided to accommodate flexing of the convolutions which intervene between the gripped crests to accommodate flexing of the cable, even during reeling upon the storage drum, without unduly stressing the conductor itself. The fairings are all anchored in position so the fairings are maintained at finite lengths along the cable, and cannot accumulate at the bottom of the cable as has been the case with some previous tow cables. Moreover, the rectangular shape of the harness and its positioning within the fairing, rather than within or along the cable, and the elimination of joints provides for maximum harness carriage with minimum frontal area. Various features of the fairing structures and securing means may be modified as will occur to those skilled in the art, and the exclusive use of all modifications as come within the scope of the appended claims is contemplated.

We claim:

1. In a tow cable; a longitudinal stress carrying member; radial shoulder-forming parts spaced along said member; and a plurality of faired structures each secured to said member at one of said parts and having portions extending along said stress carrying member a substantial distance in both directions from the corresponding shoulder-forming part and free of said member to facilitate flexing of said member relative to said structures.

2. In a tow cable; a longitudinal stress carrying member; radial shoulder-forming parts spaced along said member; and a plurality of faired structures each secured to said member at one of said parts and lodged against longitudinal movement on said stress-carrying member and each of said faired structures having a pair of loops embracing said member on opposite sides of the shoulder-forming part for anchoring the faired structure to a restricted longitudinal extent of said member whereby said member may flex without substantial restraint by said faired structures.

3. In a tow cable; a longitudinal stress carrying member; radial shoulder-forming parts spaced along said member; and a plurality of faired structures each secured to said member at one of said parts and having parallel side walls projecting tangentially from said stress bearing member and further including a flexible conductor harness extended along said member and received between the walls of said structures in undulating form, and means in each of said faired structures gripping a crest portion of a convolution of said harness, the remainder of the convolutions of said harness being free to flex to accommodate flexing of said member and resultant relative displacement of said structures.

4. In a tow cable;
a longitudinal stress carrying member;
radial shoulder-forming parts rigid with said member at intervals therealong;
a plurality of faired structures secured to said member at one of said parts in alignment therealong, each of said structures having spaced side walls projecting radially of said member and having loop elements embracing said member on opposite sides of one of said parts;

and a flexible conductor harness received in aligned undulations between the walls of said structures;

each of said structures having means adjacent said loop elements gripping a crest portion of one of said undulations;

intervening undulations in said harness being relatively free of said structures to permit longitudinal flexing of said latter undulations to accommodate flexing of said member and resultant relative displacement of said faired structures with minimum stressing of said harness.

5. The combination described in claim 4 in which said gripping means comprises longitudinally spaced abutment elements forming a pocket therebetween receiving the convex surface of a gripped crest of said harness and an opposing abutment bearing against the opposite concavity of said crest.

6. The combination described in claim 4 further including buoyant material between the side walls of each of said faired structures.

7. The combination described in claim 6 in which a single bight of said conductor is received within the confines of each of said faired structures with its concave surface facing away from said stress carrying member; said buoyant material being lodged within the space adjacent said latter surface.

8. In combination with a flexible load carrying cable of substantially uniform diameter;

a plurality of rings secured upon said cable at intervals therealong;

faired structures secured to said cable in alignment therealong;

each of said structures comprising spaced side walls projecting tangentially from said cable; and a flexible conductor harness received in aligned undulations between the side walls of said structures;

each of said structures also having loop elements secured to said side walls and embracing said cable on opposite sides of one of said rings;

longitudinally spaced abutment elements forming a pocket between the same and said cable receiving the convexity at the crest of a convolution of said harness;

shoulder means between portions of said walls spaced radially outwardly of said crest;

and abutment means resiliently reacting between said shoulder means and said crest and cooperating with said abutment elements to grip said crest and thereby anchor the same on said cable.

9. The combination described in claim 8 in which said resilient means is detachable to permit withdrawal of the corresponding faired structure and received conductor portion from said cable.

10. In combination with a flexible, load-carrying cable of substantially uniform diameter;

a plurality of rings secured upon said cable at intervals therealong, faired structures secured to said cable in alignment therealong;

each of said structures comprising spaced side walls projecting tangentially from said cable, and a flexible conductor received in aligned undulations between the side walls of said structures;

each of said structures also having a generally U-shaped clevis bracket embracing said cable on opposite sides of one of said rings;

a U-shaped clamping member embracing a crest of said conductor and with its transverse web interposed between said crest and said last mentioned ring;

the free edges of said web being out-turned to form spaced abutment elements pocketing said crest;

and means securing together said bracket and said clamping member, in nesting relationship about said cable.

11. In combination with a flexible load carrying cable of substantially uniform diameter;

a plurality of rings secured upon said cable at intervals therealong;

faired structures secured to said cable in alignment therealong;

each of said structures comprising spaced side walls projecting tangentially from said cable, and a flexible conductor harness received in aligned undulations between the side walls of said structures;

each of said structures also having generally U-shaped clamping means with spaced loops embracing said cable on opposite sides of one of said rings and side pieces extending outwardly along said side walls;

a shoulder member between and anchored in said side walls radially beyond said side pieces;

and resilient means reacting between said shoulder member and said side pieces whereby said faired structure is resiliently secured to said cable, said side walls being slightly spaced from said cable in the normal assembly.

References Cited in the file of this patent
UNITED STATES PATENTS

| | | |
|---|---|---|
| 2,401,783 | Wilcoxon | June 11, 1946 |
| 2,497,820 | Kielland | Feb. 14, 1950 |
| 2,859,836 | Wiener | Nov. 11, 1958 |
| 2,891,501 | Rather | June 23, 1959 |